E. R. SALAZAR.
BRAKE OPERATING APPARATUS.
APPLICATION FILED SEPT. 28, 1917.
1,274,336.
Patented July 30, 1918.
2 SHEETS—SHEET 2.
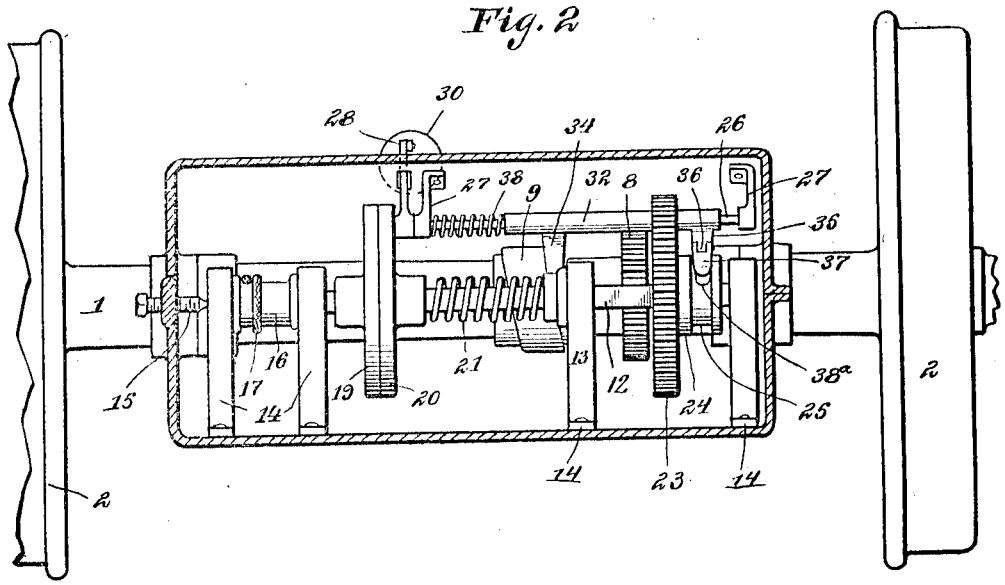
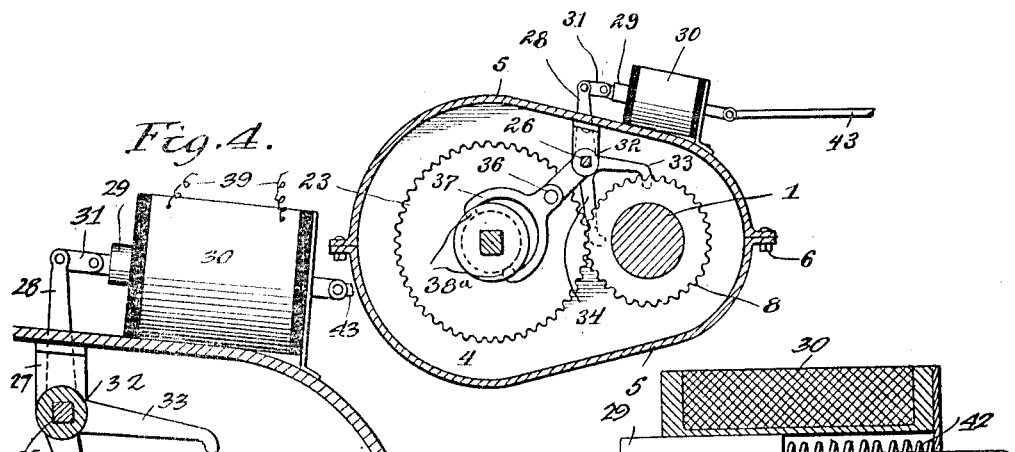
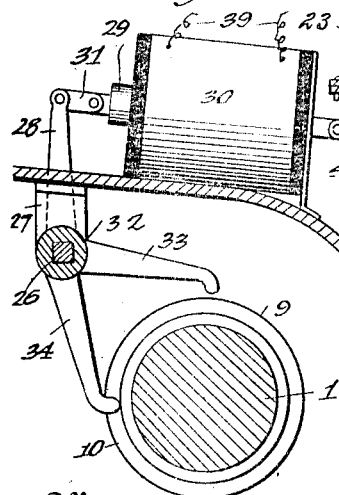
Inventor
Emilio R. Salazar,
By Victor J. Evans
Attorney
Witness
C. F. Rudolph

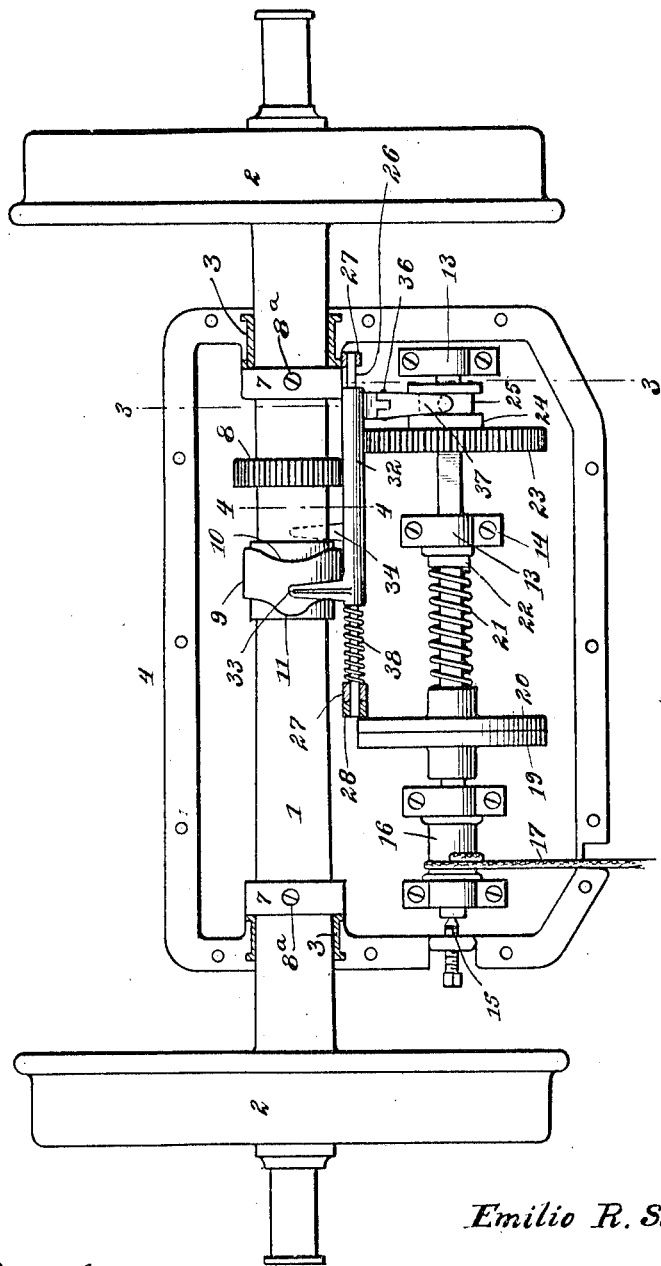

UNITED STATES PATENT OFFICE.

EMILIO R. SALAZAR, OF HABANA, CUBA.

BRAKE-OPERATING APPARATUS.

1,274,336.   Specification of Letters Patent.   Patented July 30, 1918.

Application filed September 28, 1917. Serial No. 193,762.

*To all whom it may concern:*

Be it known that I, EMILIO R. SALAZAR, a citizen of the Republic of Cuba, residing at Habana, Cuba, have invented new and useful Improvements in Brake-Operating Apparatus, of which the following is a specification.

This invention is an improved brake operating apparatus for use on railway trains, freight cars, trolley cars and the like, the object of my invention being to provide an improved brake actuating apparatus which derives its power from a car or train axle and by means of which the brakes may be applied on any car of a train or simultaneously on all the cars of a train as may be desired.

Another object of the invention is to provide an improved brake apparatus of this kind including a controlling element which may be operated electrically or manually as may be desired.

A further object of the invention is to provide an improved brake actuating apparatus of this character which can be readily installed on a railway car and which is simple in construction, is strong and durable, is positive and reliable in operation, and which is compact and of moderate weight.

The invention consists in the construction, combination and arrangement of devices hereinafter described and claimed.

In the accompanying drawings:—

Figure 1 is a diagrammatic plan of a portion of a railway car provided with brakes and with a brake actuating apparatus constructed and arranged in accordance with my invention, the casing of the brake actuating apparatus being shown partly in section and certain of the bearings being also shown in section.

Fig. 2 is a vertical longitudinal sectional view of the same.

Fig. 3 is a vertical transverse sectional view of the same on the plane indicated by the line 3—3 of Fig. 1.

Fig. 4 is a detailed vertical sectional view on the plane indicated by the line 4—4 of Fig. 1.

Fig. 5 is a detailed vertical sectional view of the solenoid.

A car axle is indicated at 1, provided with the usual wheels 2 and is mounted in bearings 3 which are arranged in the ends and near one side of a casing 4. The casing comprises a pair of members 5 which are bolted together as at 6. Collars 7 are secured on the axle by set-screws $8^a$ and serve to prevent the casing from moving endwise on the axle. A spur gear 8 is secured on the axle and a cam 9 is also secured on the axle at a suitable distance from the spur gear and is provided on the side adjacent said spur gear with a concave surface 10 and is provided on the opposite side with a projecting surface 11.

A shaft 12 which has a squared portion is arranged parallel with and at a suitable distance from the axle and is mounted in bearings 13 which are secured by ends 14 to the bottom of the casing. A thrust bearing for one end of the shaft is formed by a pointed screw 15 which passes through a threaded opening in one end of the casing. A drum 16 is mounted on the shaft for rotation independently thereof and one end of a cable 17 is attached to the drum, the other end of the cable being attached to a brake beam of usual construction. A friction disk 19 is arranged on said shaft and is connected to the drum as by means of a common sleeve to turn with the drum. A friction disk 20 is secured on said shaft to turn therewith and arranged for longitudinal movement thereon toward and from the disk 19. The disk 20 when frictionally engaged with the disk 19 and revolved by the means hereinafter described causes the disk 19 to revolve and thereby causes the drum 16 to also revolve and wind the cable 17 and thereby apply the brake. A coiled spring 21 is arranged on the shaft and bears between the hub of the disk 20 and a collar 22 with which the shaft is provided. A spur gear 23 is mounted on the squared shaft 12 for rotation therewith and for slight longitudinal movement thereon so that said gear 23 may be engaged with the gear 8 or disengaged therefrom. The gear 23 has a hub 24 which is provided with an annular circumferential groove 25.

A rock shaft 26 is arranged parallel with the axle and the shaft 12 and is mounted in bearings 27. The rock shaft is squared for the greater portion of its length and is provided at one end with a lever 28 which is arranged at right-angles thereto and to which the core 29 of a solenoid 30 is connected by means of a link 31. A carriage 32 is mounted on the rock shaft to turn therewith and for longitudinal movement thereon and is provided with arms 33, 34 which are appropriately spaced apart and are arranged substantially at right-angles to each other. The carriage also has an arm 35 which is connected by a hinged joint or pivot joint 36 to a shipper arm 37, the fork of which is provided with lugs 38ª which engage in the groove 25 of the slidable gear 23. A spring 38 is arranged on the rock shaft and exerts its tension to normally move the carriage in the required direction to cause the carriage through the instrumentality of its arm 35 and the shipper arm 37 to move the gear 23 to one side of and out of engagement with the gear 8. The arms 33, 34 of the carriage are tappet arms and are respectively adapted to engage the cam surfaces 11 and 10 of the cam 9 which is on the axle. The windings of the solenoid are connected in circuit with a generator or battery in the locomotive or in any car of a train, as will be understood. A spring 42 is provided for each solenoid to normally move the core piece outwardly and thereby cause the rock shaft 26 to normally hold the tappet arm 33 of the carriage 32 out of engagement with the face 11 of the cam 9.

The operation of my improved brake apparatus is as follows: When the solenoid is energized and moves its core piece inwardly the link 31 and lever 28 partly turn the rock shaft 26 in the required direction to engage the tappet arm 33 of the carriage 32 with the cam face 11 of the cam 9 which turns with the car axle 1. Hence said cam face 11 causes the arm 33 to move the carriage, against the tension of the spring 38 and in the required direction to cause the carriage to move the gear wheel 23 into engagement with the gear 8. Thereupon, the shaft 12 being thus momentarily geared to the axle is caused to revolve and the friction disks 19, 20 cause the drum 16 to also revolve to a sufficient extent to wind up the cable 17 and thereby apply the brakes.

To release the brakes the electric circuit is broken and the solenoid deënergized, thus enabling the spring 42 to move the solenoid core 29 outwardly and thereby cause the rock shaft to be slightly turned in the reverse direction and to disengage its arm 33 from the cam face 11 and to arrange its arm 34 in position for engagement with the cam face 10. If there is but little power being transmitted through the gears the spring 38 will then move the carriage 32 back to normal position, thus disengaging the gear 23 from the gear 8. Otherwise the arm 34 will be actuated by the cam face 10 to thus return the carriage to initial position and insure the release of the brakes.

A hand operated rod 43 may be connected to the solenoid core or plunger to enable the plunger to be manually operated by a person in the car in order to actuate the brakes.

My improved brake operating apparatus entirely obviates the dangers such as are occasioned by going between cars to couple the hose or air brake apparatus and is especially applicable to freight trains that carry only the brake hose coupler and may be introduced into passenger service by using independent heating devices for each car. It is also applicable to trolley cars and when thus used on a trolley car the motorman will not have to exert himself as with the hand brake as but very little effort is required to manually move the plunger of the solenoid which is the controlling element of my brake actuating apparatus.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. In combination with a train axle, a gear thereon, a cam also on the axle, a shaft, brake actuating means on the shaft, a gear mounted for rotation with said shaft and also for movement thereon so that said gear may be shifted into or out of egagement with the axle gear, and shifting means for said shiftable gear, said shifting means being actuated by said cam.

2. In combination with a train axle, a gear thereon, a cam also on the axle, a shaft, brake actuating means on the shaft, a gear mounted for rotation with said shaft and also for movement thereon so that said gear may be shifted into or out of engagement with the axle gear, shifting means for said shiftable gear, said shifting means being actuated by said cam, and controlling means for said gear shifting means.

3. In combination with a train axle, a shaft, gears on said axle and shaft, one of said gears being shiftable into and out of engagement with the other, shifting means for said shiftable gear and means for operating said shifting means, said operating means being operated by the power of the axle.

4. In combination with a train axle, a shaft, gears on said axle and shaft, one of said gears being shiftable into and out of engagement with the other, shifting means for said shiftable gear, means on the axle for operating said shifting means, and controlling means for said shifting means.

5. In brake apparatus of the class described, brake operating means including a shiftable gear, an axle, a cam on the axle, a rock shaft, controlling means for the rock shaft, a carriage, connections between the carriage and the gear to enable the carriage to shift the gear and a tappet arm with which the carriage is provided and arranged for engagement with the cam to cause the cam to longitudinally shift the carriage when the tappet arm is engaged with the cam.

6. In brake apparatus of the class described, brake operating means including a shiftable gear, an axle having a cam, a rock shaft, controlling means to partly turn the rock shaft, a carriage to shift the gear and mounted for longitudinal movement on the rock shaft and for turning movement therewith, said carriage having a tappet arm engageable with the cam.

7. In brake apparatus of the class described, brake operating means including a shiftable gear, an axle having a cam, a rock shaft, controlling means to partly turn the rock shaft, a carriage to shift the gear and mounted for longitudinal movement on the rock shaft and for turning movement therewith, said carriage having tappet arms alternately engageable with the cam to enable the cam to move the carriage in either direction.

In testimony whereof I affix my signature.

EMILIO R. SALAZAR.

Copies of this patent may be obtained for five cents each, by addressing the "Commissioner of Patents, Washington, D. C."